(12) United States Patent
Lewis et al.

(10) Patent No.: US 8,121,612 B2
(45) Date of Patent: *Feb. 21, 2012

(54) METHOD AND SYSTEM FOR IMPROVED WLAN LOCATION

(75) Inventors: Thomas P. Lewis, Bethel Park, PA (US); Russell A. Barr, Tarentum, PA (US)

(73) Assignee: Symbol Technologies, Inc., Holtsville, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 12/169,340

(22) Filed: Jul. 8, 2008

(65) Prior Publication Data

US 2009/0017841 A1 Jan. 15, 2009

Related U.S. Application Data

(63) Continuation of application No. 10/679,524, filed on Oct. 6, 2003, now Pat. No. 7,412,246.

(51) Int. Cl.
*H04Q 7/20* (2006.01)

(52) U.S. Cl. ............... 455/456.1; 455/67.11; 455/226.2

(58) Field of Classification Search .... 455/456.1–456.6; 342/357.08, 357.09, 357.1, 357.17
See application file for complete search history.

(56) References Cited

U.S. PATENT DOCUMENTS

| | | | |
|---|---|---|---|
| 5,870,673 A | 2/1999 | Haartsen | |
| 5,940,765 A | 8/1999 | Haartsen | |
| 6,088,586 A | 7/2000 | Haverty | |
| 2005/0096068 A1* | 5/2005 | Bahl et al. | 455/456.1 |

FOREIGN PATENT DOCUMENTS

| | | |
|---|---|---|
| GB | 2336972 A1 | 11/1999 |
| JP | 10-260994 | 9/1998 |
| JP | 11-178045 | 7/1999 |
| JP | 2003-158481 | 5/2003 |
| WO | 0038460 A1 | 6/2000 |

OTHER PUBLICATIONS

Translation of Japanese Patent Office Official Action, received on May 18, 2010—4 pages.
EPC Supplementary Search Report dated Feb. 4, 2011—3 pages.
Translation—Second Office Action—Chinese Application No. 200480029112.4 dated Apr. 14, 2011—3 pages.
Translation—Japanese Final Rejection dated Mar. 28, 2011—3 pages.
Japanese Application No. 2006-534331 (corresponding to parent application)—Rejection dated Mar. 17, 2011 (Translation)—3 pages.

* cited by examiner

*Primary Examiner* — Temica M Beamer

(57) ABSTRACT

Mobile units within an area are located using a wireless local area network. Reference signal transmitters are provided at selected fixed locations within the area. Reference signals are transmitted using the reference signal transmitters using a first selected channel of the wireless local area network. A computer is provided having a database relating signal characteristics of signals transmitted by the reference signal transmitters to location within the area At least one access point is coupled to the computer and provides wireless data communications between the computer and the mobile unit using one or more channels of the wireless data communications system that are different from the first data communications channel. A selected plurality of the reference signals are received at the mobile unit, signal characteristics of the received reference signals are determined and data representing the received reference signal characteristics is transmitted to the computer via the access point using the one or more data communications channels. The data representing reference signal characteristics is received at the computer and position of the mobile unit is determined using the database.

13 Claims, 2 Drawing Sheets

METHOD AND SYSTEM FOR IMPROVED WLAN LOCATION

PRIORITY CLAIM

This application is a Continuation application of U.S. patent application Ser. No. 10/679,524 filed on Oct. 6, 2003 now U.S. Pat. No. 7,412,246 entitled "Method and System for Improved WLAN Location". The specification of the above-identified applications is incorporated herewith by reference.

BACKGROUND OF THE INVENTION

This invention relates to wireless data communications systems and particularly to wireless data communications systems which include arrangements for locating mobile units within the area serviced by the system.

The use of mobile data communications systems to perform location functions for locating mobile units is described in articles entitled *Enhancements to the User Location and Tracking System*, by Paramvir Bahl and Venkata N. Padmanabhan, and *User Location and Tracking in an In-Building Radio Network*, Microsoft Technical Report MSR-TR-99-12, dated February 1999, by the same authors, both published by Microsoft Research. As described therein signal strength of signals of the wireless data communications system, such as a system using the protocol of IEEE Standard 802.11, are used for locating mobile units within an area serviced by the system. Other techniques for locating mobile units using the wireless data communications systems or other location system are possible.

In co-pending application Ser. No. 09/528,697, filed Mar. 17, 2000, which is owned by the assignee of the present application and incorporated herein by reference, there is described a system which follows the protocol of IEEE Standard 802.11, but which uses a combination of RF Ports and Cell Controllers to perform the functions of Access Points of a classical 802.11 data communications system. Lower level MAC functions are performed by the RF Ports and higher level MAC functions, including association and roaming functions, are performed by the cell controller. The term "access point" as used herein is intended to include conventional access points, such as those which follow the protocol of IEEE Standard 802.11 and perform all MAC functions, as well as RF Ports operating with cell controllers, as described in the incorporated co-pending application.

One problem associated with locating mobile units using a wireless local area network system is the communication burden the location function can put on the system. In a passive system wherein mobile units periodically listen for beacon signals from access points or other beacon transmitters for location determination, the mobile units must monitor beacon signals on a plurality of channels, such as 11 channels for IEEE Standard 802.11 (b) systems. Considerable operating time for a mobile unit can therefore be spent for passive monitoring of 11 channels for signals, such as beacon signals, to be used for location determination. Further, such passive monitoring can reduce the amount of time a mobile unit can operate in power save mode, therefore shortening battery life. The larger number of beacon signals that are required for the location function can also increase radio interference with data communications functions. Likewise, in arrangements wherein location signals are transmitted by reference signal transmitters or access points in response to request signals transmitted by mobile units, the request signal adds to the radio background and can further burden the media and the battery requirements of mobile units.

It is an object of the present invention to provide an improved method and system for locating mobile units using a wireless data communications system.

SUMMARY OF THE INVENTION

In accordance with the invention there is provided a method for locating mobile units within an area using a wireless local area network. Reference signal transmitters are provided at selected fixed locations within the area. The reference signal transmitters are arranged to transmit reference signals using a first selected channel of the wireless local area data network. A computer is provided having a database relating signal characteristics of signals transmitted by the reference signal transmitters to location within the area. At least one access point is provided, coupled to the computer and providing wireless data communications between the computer and at least one mobile unit in the area using one or more channels of the wireless data communications system that are different from the first data communications channel. A selected plurality of the reference signals are received by the mobile unit, and signal characteristics of the received reference signals are determined. Data representing the signal characteristics is transmitted to the computer via the access point using the one or more data communications channels that are different from the first selected channel. The data representing signal characteristics is received at the computer and position of the mobile unit is determined using the database.

In a preferred arrangement the computer has a database relating signal strength characteristics to location within the area. The signal characteristic determined for the received reference signals may be received signal strength for the reference signals. The wireless local area network may be an IEEE Standard 802.11 network and determining signal strength may comprise determining RSSI value at the mobile unit. The reference signals may be periodically transmitted beacon signals. Different reference signal transmitters may transmit beacon signals at slightly different beacon intervals. Alternately, the reference signal transmitters can be arranged to delay transmission if another reference signal transmission is detected. Alternately, the reference signals can be transmitted in response to request signals transmitted by the mobile unit on the first selected channel. In a preferred arrangement the first selected channel is non-overlapping with the channels used by the access point for data communications.

In accordance with the invention there is provided a system for locating mobile units within an area using a wireless local area network. A selected plurality of reference signal transmitters are located at selected fixed locations within the area. The reference signal transmitters are arranged to transmit reference signals using a first selected channel of the wireless local area network. A computer is provided having a database relating signal characteristics of signals transmitted by the reference signal transmitters to location within the area. At least one access point is coupled to the computer and provides wireless data communications between the computer and one or more mobile units in the area using one or more channels of the wireless data communications system that different from the first data communications channel. At least one mobile unit is arranged to receive a selected plurality of the reference signals, determine signal characteristics of the received reference signals and transmit data representing the reference signal characteristics to the computer via the at least one access point using the one or more data communications channels that are different from the first selected channel. The computer is arranged to receive the data representing reference signal characteristics and determine position of the mobile unit using the database.

In accordance with a preferred embodiment of the invention, the computer has a database relating signal strength characteristics to location within the area, and the mobile unit determines received signal strength for the reference signals. The wireless local area network may be an IEEE Standard 802.11 network and signal strength can be determined using RSSI value at the mobile unit. The reference signal transmitters may be arranged to periodically transmit the reference signals as beacon signals at selected beacon intervals, which may be different for different transmitters. Alternately the reference signal transmitters may be arranged to delay transmission if another reference signal transmission is detected. Alternately, the reference signal transmitters may transmit reference signals in response to request signals transmitted by a mobile unit using the first selected channel. The first selected channel is preferrably non-overlapping with the data communications channels used by the access point.

In accordance with the invention there is provided a mobile unit, which includes a radio unit arranged to receive reference beacon data signals using a first selected channel and to transmit and receive data signals using at least one data communications channel that is different from the first data communications channel. A processor is arranged to determine received signal characteristics of the reference beacon signals received on the first selected channel, generate data representing the received signal characteristics and cause the radio unit to transmit a data message having the generated data.

In a preferred arrangement, the processor is further arranged to control the radio unit to receive the reference beacon signals only during selected periodic time intervals having a selected duration. In an active arrangement the mobile unit may be arranged to send a request signals using the first selected channel and receive reference signals in response to request signals. The first selected channel is preferrably non-overlapping with the data communications channels.

For a better understanding of the present invention, together with other and further objects thereof, reference is made to the following description, taken in conjunction with the accompanying drawings, and its scope will be pointed out in the appended claims.

DESCRIPTION OF THE INVENTION

The present invention will be described with respect to an embodiment for operation with a wireless data communications system operating according to the IEEE Standard 802.11 (b) protocol. It will be understood by those skilled in the art that the invention may be used in arrangements operating according to other protocols. In addition the term "mobile unit" as used herein is not intended to be limited to mobile units operating according to a wireless data communications protocol, but is intended to apply to units whose location is to be tracked, including portable customer shopping terminals, asset "tags" and tracking devices, which may not have data communications functions.

Figure 1:
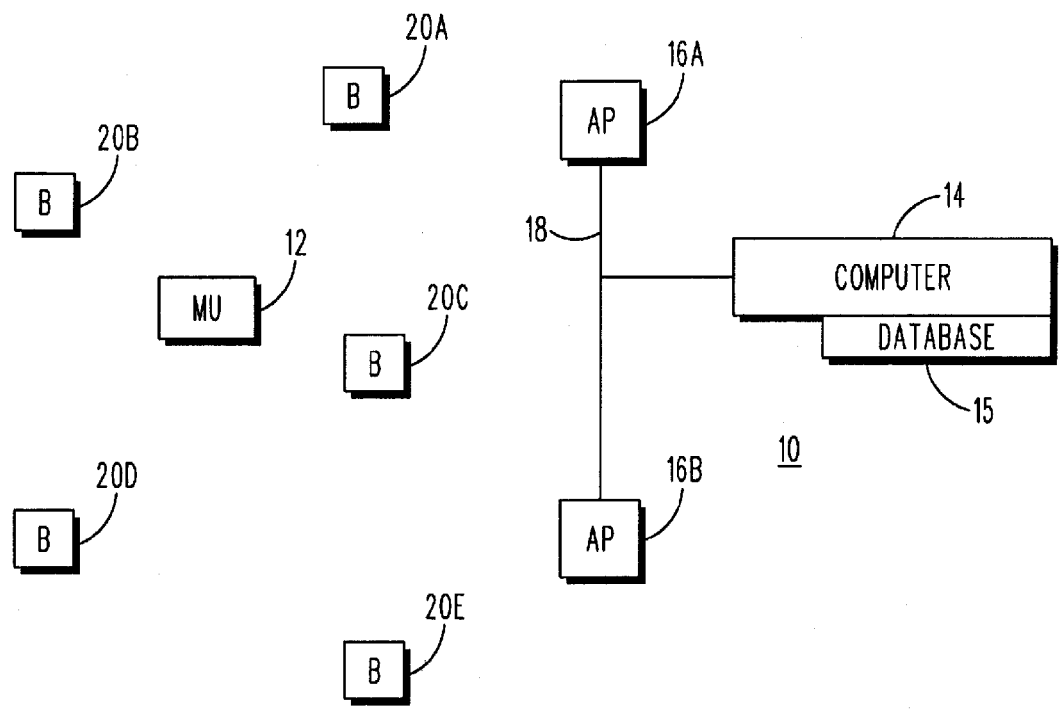
FIG. 1 is a block diagram showing an arrangement of an embodiment of the present invention.

Referring to FIG. 1 there is shown an arrangement of a wireless data communication network 10, which may follow the IEEE 802.11 (b) protocol. The network 10 includes a mobile unit 12 which may be arranged to communicate with a computer via one or more access points 16A and 16B, which are connected to computer 14 via local area network 18. Those familiar with such systems will recognize that the network may include more than one computer, and may also include portals to a wide area network, telephone interface, an internet connection, and other devices for data communication.

Figure 2:
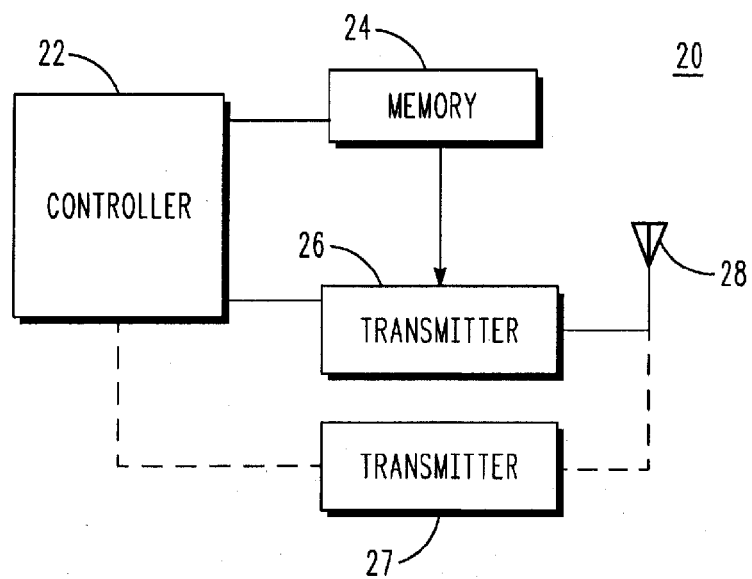
FIG. 2 is a block diagram illustrating an embodiment of a beacon transmitter in accordance with the invention.

The system of FIG. 1 includes a plurality of beacon transmitters (B) 20A through 20E (collectively referred to by reference numeral 20) which are distributed over an area within which it is desired to locate mobile units, such as mobile unit 12. A representative embodiment of a beacon transmitter 20 is shown in FIG. 2. Beacon transmitter 20 includes a memory 24 which includes a fixed beacon message identifying the beacon transmitter. In any system installation no two transmitters should have the same beacon identification. Beacon transmitter 20 further includes a radio transmitter 26, which is controlled by controller 22 to periodically transmit the fixed beacon message. Controller 22 may be a programmed microcomputer or simple digital signal processor, which is arranged to periodically, for example fifty times per second, power up transmitter 26 and then transmit the fixed message stored in memory 24, which may be part of the microprocessor or controller 22. Following transmission, the transmitter may be powered down and the microcomputer or processor 22 may be switched to low power operation. The beacon transmitter 20 may be arranged to plug into a wall electrical outlet or receive power from a lighting fixture as described in co-pending application Ser. No. 60/440,171, filed Jan. 15, 2003, which is incorporated herein by reference. Alternately, if a lower duty cycle is used, the beacon transmitter 20 may be battery powered.

Since the beacon transmitters do not receive signals, there is no need for continuous power to the radio thereof Further the beacon transmitters are inexpensive to fabricate and require no wiring for installation, operating on available power or on battery power. They may be mounted to a wall or ceiling using for example adhesive tape. Alternately, they may be arranged to plug into electrical outlets.

The system utilizes a database 15 relating signal power from the beacon transmitters to location within the area to be covered. Such database can be generated from an initial survey of the RF environment created by the beacon transmitters.

The mobile unit 12 may be a conventional IEEE standard 802.11 mobile unit with additional software to recognize and record the signal level of beacon signals received from the beacon transmitters 20. Since the mobile units are normally arranged to receive beacon signals from access points 16A and 16B, no additional hardware is required.

Alternately, the mobile units may be units that are not arranged to communicate using 802.11 protocol. Such units merely require receivers for implementing the location system according to the invention. The location data can be communicated via another system or can be internally stored, for example to track the movements of personnel, such as a watchman, or company vehicles. For tracking purposes the signal level data may be recorded in a memory for later read-out and processing.

In accordance with the invention the beacon transmitters transmit reference signals on a first selected channel of the network and the communications between the mobile units and access points take place over other channels that are different from the first selected channel of the system. For example, in a system using IEEE Standard 802.11 (b), which uses 11 channels in the United States, the beacon signals are transmitted over channel 1, and data communications take place on one or more over channels 2 to 11. Preferably, the first selected channel is non-overlapping with the channels used for data communications. Accordingly, the beacon transmitters 20 may transmit beacon or other reference signals on channel 1 and thereby avoid interference with data communications signals between the mobile unit 12 and the access points 16A and 16B may be restricted to non-overlapping channels 6 and 11.

The beacon transmitters are arranged to periodically transmit beacon signals, for example beacon signals having a duration of 225 to 350 microseconds may be transmitted every 20 to 50 milliseconds when using a 1 Mb/sec. data rate. At a data rate of 11 Mb/sec. the beacon signal may have a duration as short as 22 microsecond.

The beacon transmitters 20 are more generally referred to as reference signal transmitters. In an alternate embodiment the mobile units may undertake an active scan and send request signals which cause reference transmitters to send a responsive message from which location may be determined.

In order to avoid collisions between signals transmitted by reference signal transmitters, the transmitters may operate at slightly different time intervals. Alternately, the reference signal transmitters may include a carrier detector 27, which delays operation of the transmitter for a selected time period if another carrier is detected.

Figure 3:
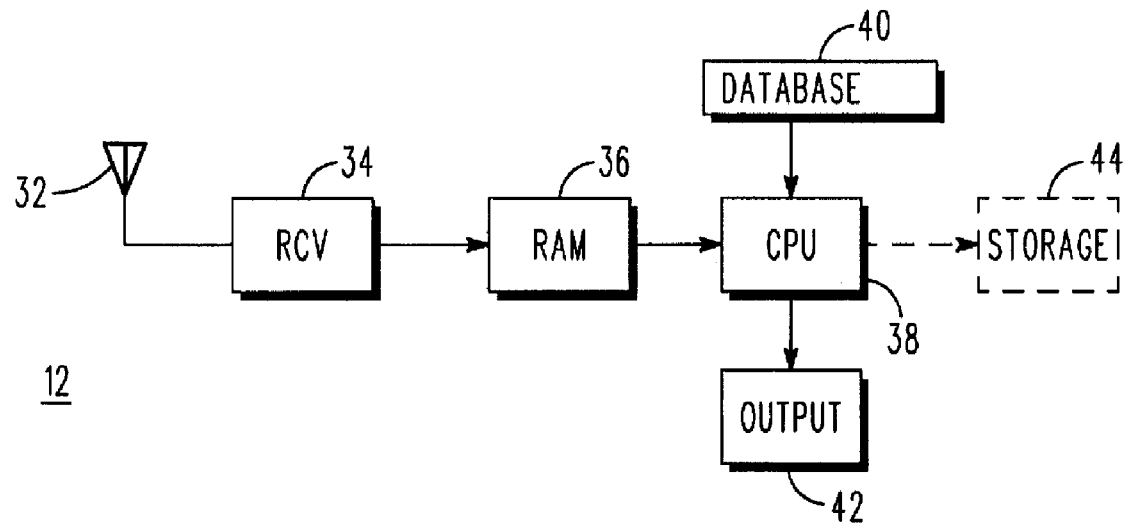
FIG. 3 is a block diagram illustrating a first embodiment of a mobile unit in which may be used in the system of FIG. 1.

FIG. 3 is a block diagram showing an arrangement for a mobile unit according to one embodiment of the invention. Mobile unit 12 shown in FIG. 3 is configured to process the data corresponding to beacon signal received signal strength and compute its location without communication with an external computer. Unit 12 may be part of a mobile unit operating according to IEEE 802.11 or may, for example, be a portable telephone device, a motion tracking device or an asset "tag". Mobile unit 12 includes antenna 32 for receiving beacon signals which are provided to receiver 34, which extracts the data message giving the beacon transmitter identification. Receiver 34 additionally determines the received signal strength and provides data corresponding thereto to memory 36 correlated with the beacon transmitter identification. When beacon identification and signal strength data are received from a selected number of beacons, such as three or four beacons, the data is made available to CPU 38, which may be a microcomputer or digital signal processor programmed to determine location information using the beacon identification and signal strength data stored in RAM 36 and a database 40 which correlates signal strength for the beacon transmitters with location. Preferrably CPU operates to conserve power from a battery by only powering receiver 34 for selected intervals, such as every 2.5 sec. The location information may be provided to an output device 42, which may be a display or a data transmitter for sending location data to a central computer. Alternately, or in addition, location data may be recorded in storage 44, for example to record movement of a watchman or to record movement of a vehicle. CPU 38 may provide storage 44 with time reference data along with location data for storage. Alternately, the signal characterizing data may be recorded in the mobile unit for later access and analysis, for example to trace movement of a person or asset.

Figure 4:
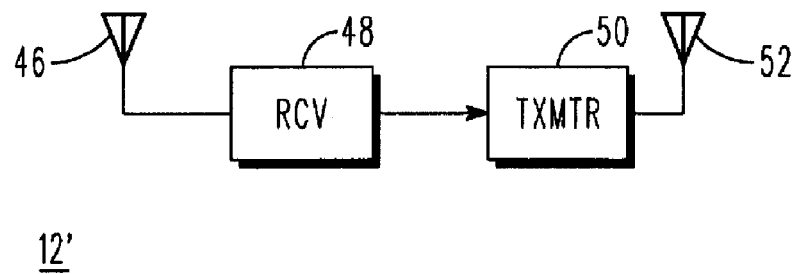
FIG. 4 is a block diagram illustrating a second embodiment of a mobile unit in which may be used in the system of FIG. 1.

In another arrangement the processing may be provided in a central computer in which case the mobile unit merely relays the data corresponding to received signal strength and beacon identification to a central processor periodically or on request from the central computer. The mobile unit 12' of FIG. 4 is arranged to receive beacon signals on a first selected channel from beacon transmitters 20 using antenna 46 and receiver 48, and provide the corresponding beacon identification data and signal strength data to transmitter 50 which relays the data to a computer using transmitting antenna 52 and a data communications channel that is different from the first channel. Antennas 46 and 52 may be combined into a single antenna. In a system using the FIG. 4 mobile unit, the database correlating signal strength for the beacon transmitters and location is maintained in a computer, such as computer 14 connected to wireless network 10 for computation of the location of mobile unit 12'.

Those skilled in the art will recognize that the system may use signal strength ratio computations as an alternative to absolute signal strength for purposes of computing position of the mobile unit.

While there have been described what are believed to be the preferred embodiments of the invention, those skilled in the art will recognize that other and further changes and modifications may be made thereto without departing from the spirit of the invention, and it is intended to claim all such changes and modifications as fall within the true scope of the invention.

We claim:

1. A computer storage medium containing instructions that when executed results in a performance of:
    providing reference signal transmitters at selected fixed locations within said area;
    receiving reference signals from reference signal transmitters at selected fixed locations within an area of a wireless local area network using a first selected channel of the wireless local area network;
    providing a database relating signal strengths of signals transmitted by said reference signal transmitters to location within said area;
    providing wireless data communications with at least one mobile unit in said area using one or more data communications channels of said wireless local area network that are different from said first selected channel;
    determining signal strengths of the received reference signals at said at least one mobile unit and transmitting data representing said received reference signal strengths using the one or more data communications channels; and
    determining a position of said mobile unit using said database.

2. The computer storage medium of claim 1, wherein the received signal strengths includes an RSSI value at the mobile unit.

3. The computer storage medium of claim 1, wherein the reference signal strength is provided via an access point to a computing device executing the instructions of the computer storage medium.

4. The computer storage medium of claim 1, wherein the instructions are executed on a microcomputer.

5. The computer storage medium of claim 1, wherein the instructions are executed by a digital signal processor.

6. The computer storage medium of claim 1, wherein the determining is based on a signal strength ratio computation.

7. The computer storage medium of claim 1, wherein the determining is based on an absolute signal strength computation.

8. A mobile unit, comprising:

a radio unit operable for receiving reference signals from a selected plurality of reference signal transmitters located at selected fixed locations within an area of a wireless local area network using only a first selected channel and operable for transmitting data using at least one other data communications channel of the wireless local area network different from the first selected channel; and a processor operable to communicate with a database relating signal strengths of signals transmitted by the reference signal transmitters to locations within the area, the processor operable for powering up the radio unit at selected time intervals, determining received signal strengths of the reference signals received on the first selected channel, generating data representing the received signal strengths, determining a position of the mobile unit using the database by comparing the signal strength data to the database, transmitting the position using the at least one other communications channel and thereafter powering down the radio unit.

9. The mobile unit of claim 8, wherein the received signal strengths includes an RSSI value at the mobile unit.

10. The mobile unit computing device of claim 8, wherein the processing unit determines the position based on a signal strength ratio computation.

11. The mobile unit computing device of claim 8, wherein the processing unit determines the position based on an absolute signal strength computation.

12. A mobile unit of claim 8 wherein the processor is further arranged to control the radio unit to receive the reference beacon signals only during selected periodic location time intervals having a selected duration.

13. A mobile unit of claim 8, wherein the mobile unit is arranged to transmit request signals using the first selected channel and receive the reference signals in response to the request signals.

* * * * *